United States Patent
Muramatsu

(10) Patent No.: US 7,217,881 B2
(45) Date of Patent: May 15, 2007

(54) CONTROL APPARATUS WITH OPERATOR MEMBER CONTROLLABLE BY REACTIVE FORCE

(75) Inventor: Shigeru Muramatsu, Mori-machi (JP)

(73) Assignee: Yamaha Corporation, Hamamatsu-shi (JP)

( * ) Notice: Subject to any disclaimer, the term of this patent is extended or adjusted under 35 U.S.C. 154(b) by 448 days.

(21) Appl. No.: 10/812,888

(22) Filed: Mar. 31, 2004

(65) Prior Publication Data

US 2004/0196261 A1 Oct. 7, 2004

(30) Foreign Application Priority Data

Apr. 2, 2003 (JP) ............................. 2003-099613

(51) Int. Cl.
*G10H 3/00* (2006.01)
(52) U.S. Cl. .......................................... 84/723; 715/701
(58) Field of Classification Search .................. 84/723, 84/743; 715/701, 702
See application file for complete search history.

(56) References Cited

U.S. PATENT DOCUMENTS

| 5,661,253 | A | * | 8/1997 | Aoki ............................ 84/658 |
| 5,952,806 | A | | 9/1999 | Muramatsu |
| 6,703,550 | B2 | * | 3/2004 | Chu ............................. 84/609 |
| 6,704,002 | B1 | * | 3/2004 | Martin et al. ................ 345/161 |
| 7,039,866 | B1 | * | 5/2006 | Rosenberg et al. .......... 715/701 |
| 2004/0095369 | A1 | * | 5/2004 | Takeuchi et al. ............. 345/701 |

FOREIGN PATENT DOCUMENTS

JP 10-177387 A 6/1998

* cited by examiner

*Primary Examiner*—Jeffrey W Donels
(74) *Attorney, Agent, or Firm*—Smith Patent Office

(57) ABSTRACT

There is provided an operator member displaceable, in response to operation by a human operator, relative to at least one displacement axis (more preferably, multi-dimensionally). Operating state of the operator member is detected and model operation information, indicative of an operating state to be taken by the operator member, is generated, so that reaction information is generated in accordance with a difference between the detected actual operating state and an operating state indicated by the model operation information. Reactive force is imparted to the operator member in accordance with the generated reaction information. In this way, a model operation amount can be informed to the human operator in the form of the reactive force. Further, by imparting separate reactive forces to a multi-axially operable operator member, appropriate information can be provided to the human operator during operation of the operator member, thereby achieving sensory feedback to the human operator.

9 Claims, 5 Drawing Sheets

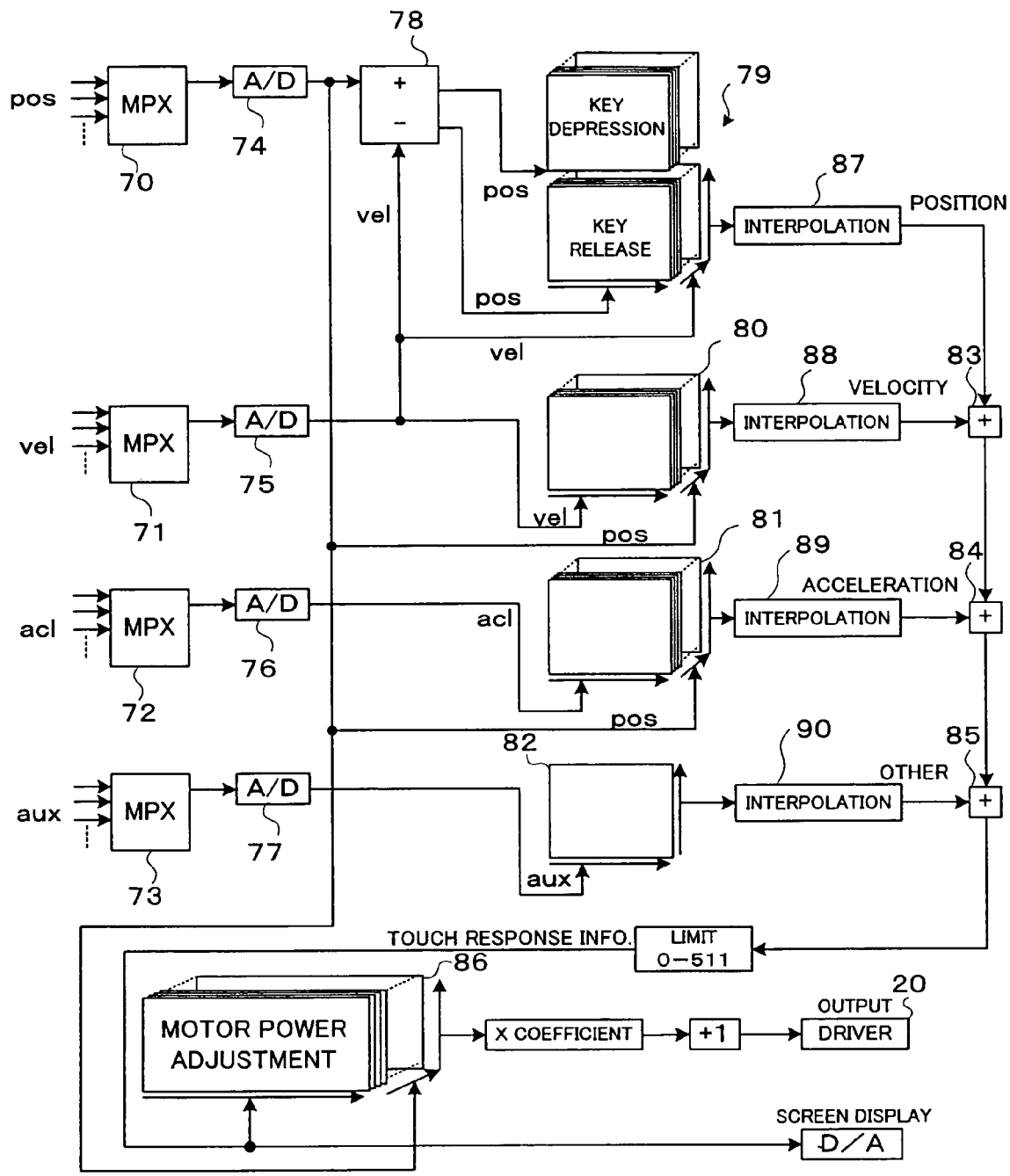
F I G. 5

CONTROL APPARATUS WITH OPERATOR MEMBER CONTROLLABLE BY REACTIVE FORCE

BACKGROUND OF THE INVENTION

The present invention relates to a control apparatus that includes an operator member movable or displaceable relative to one or more displacement axes, and more particularly to a technique for imparting reactive forces to the operator member in response to operation by a human operator. The present invention can be suitably used not only for performance input operation in electronic musical instruments but also for input operation in various games, CAD designing, etc.

In Japanese Patent Application Laid-open Publication No. HEI-10-177387, there is disclosed an apparatus which includes an operator member operable by a human operator, an actuator for moving the operator member and a sensor for detecting a position etc. of the operator member. In the apparatus, driving of the actuator is controlled so as to impart the operator member with reactive forces responsive to input operation, by the human operator, of the operator member.

In the apparatus disclosed in the publication, the intensity, direction, etc. of the reactive forces to be imparted to the operator member are controlled by driving the actuator in accordance with information based on operation actually performed by the human operator on the operator member, such as position information, velocity information and acceleration information, and thus a reactive force, only corresponding to (proportional to) an actual amount of operation by the human operator, is always given to the human operator. Therefore, where pitch, color, volume, etc. of tones are to be controlled in accordance with detected position information output from a sensor, it would be very difficult for the human operator to properly perceive and recognize correlation between the reactive force imparted to the operator member in accordance with a current operating amount and control amounts of the tone pitch, color, volume, etc. to be controlled in response to the current operating amount. Namely, the human operator has no choice but to repeat trial and error, in order to effectively learn how to properly operate the operator member (i.e., correlation between the operating amount perceived through the reactive force and the control amounts corresponding to the current operating amount), which unavoidably results in poor efficiency in learning how to properly operate the operator member. Particularly, where the operator member is in the form of a multi-axially operable operator member, such as a joystick, it tends to be even more difficult for the human operator to accurately ascertain whether or not the operator member has been operated to an operating amount or operating position as desired by him or her, because, in this case, positional operation of the operator member becomes significantly complicated.

SUMMARY OF THE INVENTION

In view of the foregoing, it is an object of the present invention to provide an improved control apparatus which allows correlation between a predetermined control amount and an operating amount of an operator member to be readily recognized through a reactive force imparted to the operator member.

It is another object of the present invention to provide an improved control apparatus which permits appropriate reactive force impartment in controlling a tone signal or the like.

According to a first aspect of the present invention, there is provided a control apparatus which comprises: an operator member displaceable, in response to operation by a human operator, relative to at least one displacement axis; a detection section that detects an operating state of the operator member; a supply section that supplies model operation information indicative of an operating state to be taken by the operator member; a reactive force information generation section that generates reactive force information corresponding to a difference between the operating state detected by the detection section and the operating state indicated by the model operation information; and a reactive force impartment section that imparts the operator member with a reactive force corresponding to the reactive force information generated by the reactive force information generation section.

In the present invention, a comparison is made between an actual operating state of the operator operated by the human operator and the operating state (model or reference operating state) designated by model operating information, and reactive force information is generated in accordance with a difference between the actual operating state of the operator and the model operating state. Reactive force or reaction is imparted to the operator member in accordance with the generated reactive force information. Such arrangements allow the human operator to perceive, on the basis of the imparted reactive force, the difference between the actual operating state and the model operating state. The operating state to be compared may be any of physical amounts of an operating position, operating velocity, operating acceleration, etc. For example, in the case where an operating position of the operator member is to be compared with a model or reference operating state, an operating position detection device is used as the detection section.

According to a second aspect of the present invention, there is provided a control apparatus which comprises: an operator member pivotable, in response to operation by a human operator, relative to a plurality of axes; a plurality of detection sections provided in corresponding relation to the plurality of axes, each of the detection sections detecting an operating state, for the corresponding axis, of the operator member to thereby output a detection signal corresponding to the detected operating state; a reactive force information generation section that generates separate reactive force information to be applied to the individual axes on the basis of the detection signals outputted by the plurality of detection section; and a reactive force impartment section that imparts the individual axes with separate reactive forces on the basis of the reactive force information generated for the individual axes by the reactive force information generation section. Thus, a plurality of control signals are provided on the basis of the detection signals outputted from the individual detection sections. In this way, the present invention can impart separate reactive forces to the multi-axially operable operator member with respect to the individual axes so that appropriate information is provided to the human operator for the individual operation axes during operation of the operator member, thereby achieving sensory feedback to the human operator. In an embodiment, the control apparatus may further comprise a tone control section that controls a tone on the basis of the plurality of control signals.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described herein below in greater detail with reference to the accompanying drawings, in which:

FIG. 5 is a block diagram explanatory of details of a touch response impartment function shown in FIG. 3.

DETAILED DESCRIPTION OF THE EMBODIMENTS

Description will be made herein below about an embodiment of a control apparatus in relation to a case where the control apparatus is applied to a performance input apparatus for a musical instrument performance.

Figure 1A:
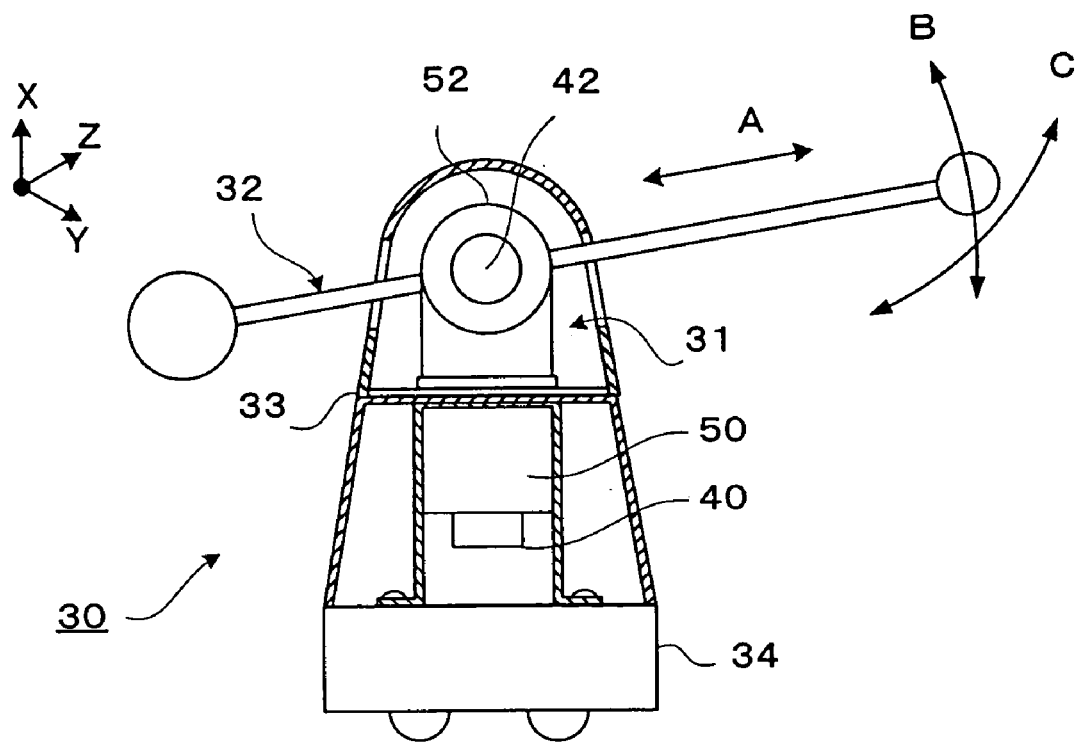
FIG. 1A is a schematic sectional side view of a control apparatus in accordance with an embodiment of the present invention.
Figure 1B:
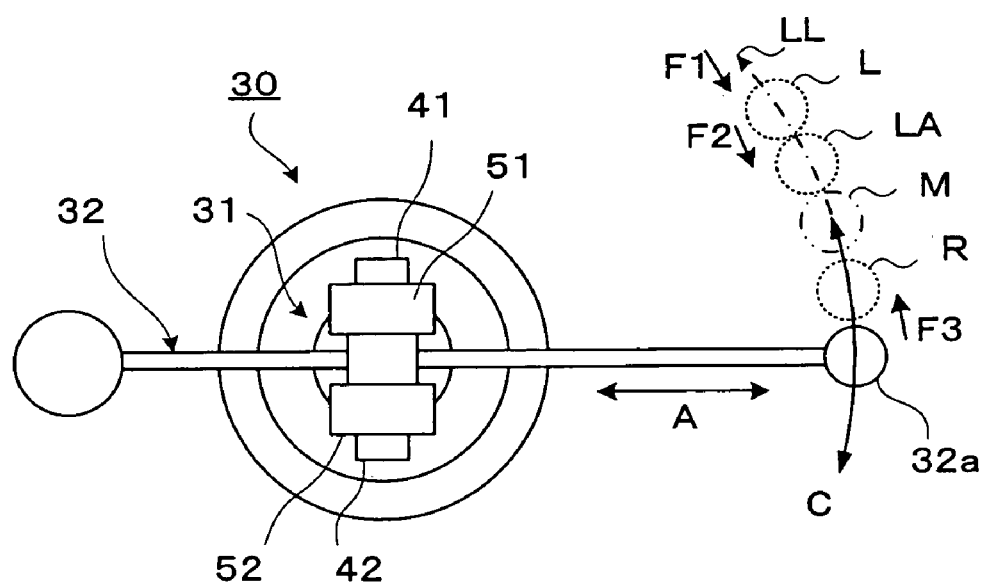
FIG. 1B is a top plan view of the control apparatus of FIG. 1A.
Figure 2:
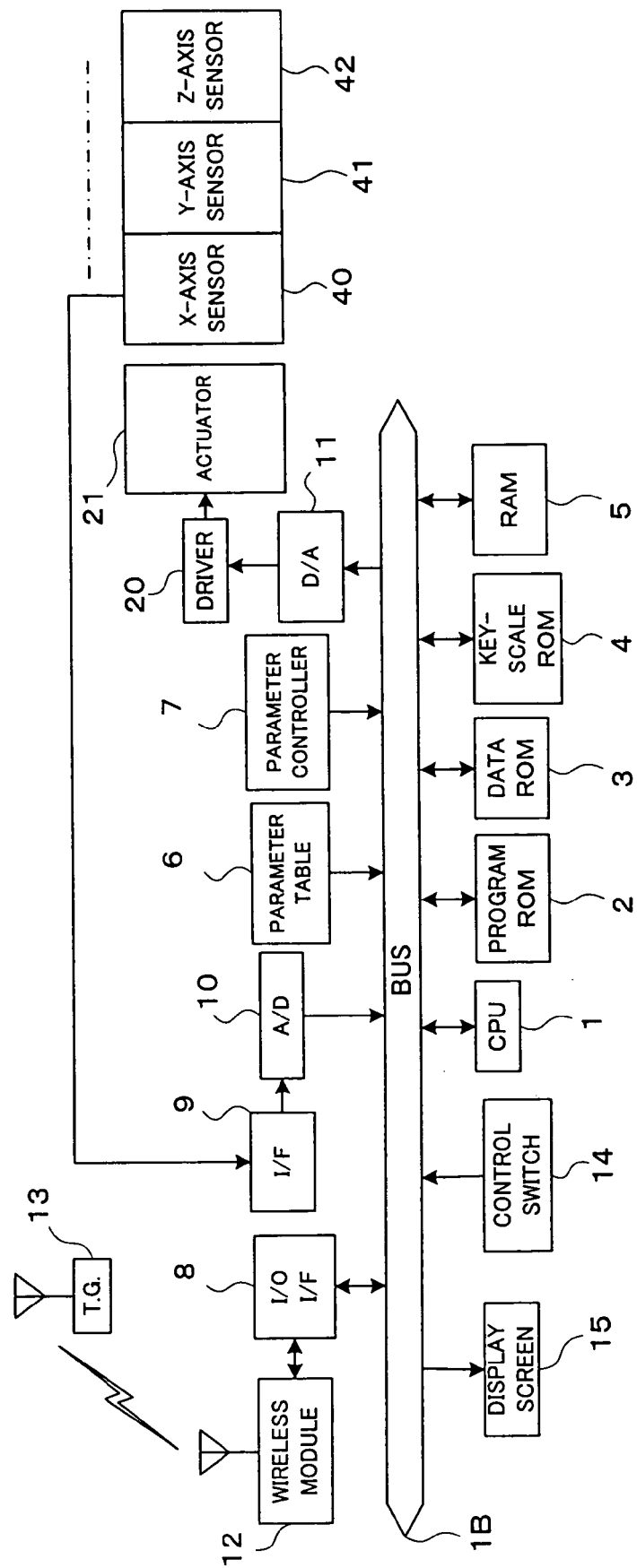
FIG. 2 is a block diagram illustrating various functions performed by the hardware of the first embodiment of the present invention.

FIG. 1A is a schematic sectional side view of the control apparatus 30 of the present invention, and FIG. 1B is a top plan view of the control apparatus 30 of FIG. 1A with an external casing 33 of the apparatus removed for clarity of illustration. FIG. 2 is a block diagram showing an example hardware setup of the control apparatus 30. As illustrated in FIG. 1, the control apparatus 30 generally comprises a base section 31 accommodated within the exterior casing 33, and an operator member 32 movably attached to the base section 31. The base section 31 is placed on a control box 34 where electronic circuit components, such as a CPU, are accommodated. The operator member 32, which is generally in the form of an elongated rod, is movable or displaceable relative to (i.e., about or along) three axes, i.e. X, Y and Z axes. Namely, ass seen in FIGS. 1A and 1B, the rod-shaped operator member 32 is pivotally movable in a direction of arrow C about the X axis (i.e., pivotally movable in a left-and-right direction as viewed from a human operator), pivotally movable in a direction of arrow B about the Y axis (i.e., pivotally movable in an up-and-down direction as viewed from the human operator), and linearly movable in a direction of arrow A along the Z axis (i.e., linear movable in a front-and-rear direction as viewed from the human operator). In the instant embodiment, the human operator of the control apparatus 30 can enter and control tone factors, corresponding to operating positions of the operator member 32 relative to the individual axes, by properly manipulating the operator member 32 relative to (i.e., about or along) the X, Y and Z axes while gripping a distal end portion 32a of the operator member 32. Let it be assumed here that, in the instant embodiment, a tone pitch can be controlled in accordance with an operating position of the operator member 32 relative to the X axis, a tone volume can be controlled in accordance with an operating position of the operator member 32 relative to the Y axis and a tone color can be controlled in accordance with an operating position of the operator member 32 relative to the Z axis.

In the base section 31, there are provided an X-axis sensor section 40, Y-axis sensor section 41 and Z-axis sensor section 42, in corresponding relation to the three axes (X, Y and Z axes) about or along which the operator member 32 is operated by the human operator, for detecting operating positions of the operator member 32 relative to the individual axes. The sensor sections 40–42, provided in corresponding relation to the three axes (X, Y and Z axes), may each be an appropriate one-dimensional rotational position sensor or linear position sensor capable of detecting an operating position, relative to (i.e., about or along) the corresponding axis, of the operator member 32. Let it be assumed that, in the instant embodiment, the sensor sections 40–42 each comprise a rotational position sensor. If necessary, velocity and acceleration of the operator member 32 can also be determined by differentiating the detection data output from the position sensors. Note that the sensor sections 40–42 may comprise velocity or acceleration sensors, rather than the position sensors. For example, operating positions of the operator member 32 may be determined by integrating the velocities detected by the velocity sensors. In the base section 31, there are also provided an X-axis motor section 50, Y-axis motor section 51 and Z-axis motor section 52, in corresponding relation to the X, Y and Z axes, for imparting the operator member 32 with separate, i.e. axis-by-axis, reactive forces. Namely, by driving of the motor sections 51–52, separate reactive forces can be imparted to the operator member 32 independently among the X, Y and Z axes.

As shown in FIG. 2, the control apparatus 30 includes a CPU 1 for controlling behavior of the apparatus 30, a program ROM 2 having stored therein various programs, a data ROM 3, a key-scale ROM 4, a working RAM 5, a parameter table 6, a parameter controller 7, an input/output interface (I/F) 8, a display screen 15, etc. and these components are interconnected via a communication bus 1B. Interface 9 is provided for receiving outputs from the X-axis, Y-axis and Z-axis sensor sections 40, 41 and 42 in a time-division multiplexing manner. Each of the sensor outputs received via the interface 9 is converted by an A/D converter 10 into a digital signal, which is then supplied via the communication bus 1B to the CPU 1. To a driver 20 is connected an actuator 21 for driving the X-axis, Y-axis and Z-axis motor sections 50, 51 and 52. Whereas the actuator 21 is shown in FIG. 2 as a single block, it may be constructed of three separate actuators for driving the respective motor sections 50–52.

The driver 20 controls driving of the actuator 21, i.e. turns on/off the actuator 21 in a controlled manner, on the basis of drive signals generated under control of the CPU 1. The drive signals are each supplied to the driver 20 after being converted into an analog signal via a D/A converter 11. Also, the drive signals may each be in the form of a PWM (Pulse Width Modulated) current signal. The drive signals are each reactive force information for imparting a reactive force to the operator member 32. Specifically, a separate drive signal is generated for each of the X, Y and Z axes on the basis of a difference between an operating position, about or along the corresponding axis, of the operator member 32 based on or designated by predetermined model operation information (i.e., reference operating position) and an operating position, about or along the corresponding axis, of the operator member 32 actually determined on the basis of the corresponding sensor output (actual current operating position). With such reactive forces imparted to the operator member 32 in accordance with the thus-generated drive signals, the human operator can perceive, via the operator member 32, the difference between the reference operating position and the actual current operating position to which the operator member 32 has been moved by the human operator. Namely, in the instant embodiment, the intensity of the reactive force for each of the axes is varied to make an operating feel of the operator member 32 heavier or lighter in accordance with a difference value between the reference operating position and the actual current operating position. In this way, as the operator member 32 is moved in a given direction toward or away from the reference operating position, the operator member 32 is sequentially imparted with reactive forces, as will be later detailed.

The data ROM 3 includes a music piece data memory section storing MIDI performance data of one or more music pieces, and a model operation information table. In the model operation information table, there are stored data indicating correspondency between a plurality of operating positions the operator member 32 can take for the individual axes and control amounts (control of the tone factors allocated to the axes. In one example, the model operation information table stores therein data indicating correspondency between a plurality of possible operating positions, within a pivotable range about the X axis, of the operator member 32 and a plurality of tone pitches within a predetermined tone pitch range, so that information indicative of an operating position for the X axis, corresponding to a tone pitch designated by a tone pitch parameter of various performance parameters included in MIDI performance data read out from the music piece data memory section, is output from the table as X-axis model operation information. The model operation information table also stores therein data indicating correspondency between a plurality of possible operating positions, within a pivotable range about the Y axis, of the operator member 32 and a plurality of tone volume levels within a predetermined tone volume range, so that information indicative of an operating position for the Y axis, corresponding to a tone volume designated by a tone volume parameter of various performance parameters included in MIDI performance data read out from the music piece data memory section, is output from the table as Y-axis model operation information. The model operation information table also stores therein data indicating correspondency between a plurality of possible operating positions, within a linear movable range along the Z axis, of the operator member 32 and a plurality of tone colors, so that information indicative of an operating position for the Z axis, corresponding to a tone color designated by a tone color parameter of various performance parameters included in MIDI performance data read out from the music piece data memory section, is output from the table as Z-axis model operation information. In this way, the instant embodiment can generate model operation information indicative of operating positions to be taken by the operator member 32 for the individual axes, on the basis of the MIDI performance data. With such model operation information, the instant embodiment can designate accurate operating states of the operator member 32 for the individual axes, in accordance with a progression of a performance, which are to be realized in order to appropriately perform a given music piece. Note that the MIDI performance data may be of any of the conventionally-known automatic performance sequence data formats, including data formats of the MIDI standard or simplified MIDI standard. For example, the MIDI performance data may comprise a sequenced repetition of performance event data each indicative of a pitch, volume or color of a tone to be generated and delta time data each indicative of generation timing of event data in a relative time from preceding event data. The music piece data memory section and/or the model operation information table may be implemented by other than the ROM, such as a rewritable memory like a RAM, or may be implemented via other means, such an external memory or communication network.

The parameter table 6, which may be implemented by a ROM, RAM or the like, can be used to calculate values of various parameters and touch reaction setting parameters. For example, the parameter table 6 can be used to set parameter values for various tone factors, such as a tone pitch, volume and color, corresponding to the sensor outputs received via the interface 9, set touch-reaction parameter values, etc. Further, control rules to be applied to the setting of the tone factor parameter setting values and setting of touch reaction, corresponding to a tone generator used, may be variably set as desired via the parameter controller 7. The key-scale ROM 4 can be used to change a scale of a train of tone pitches input via the operator member 32.

In the illustrated example of FIG. 2, a wireless module 12 is connected to the input/output I/F 8 so that the control apparatus 30 is connected wirelessly, via the wireless module 12, with the tone generator 13 physically separated from the control apparatus 30. The wireless connection allows the control apparatus to be readily connected with the tone generator 13 regardless of an installed place of the control apparatus, and thus the user can carry the control apparatus 30 to any desired place and enjoy a performance with the apparatus at the desired place.

The CPU 1 refers to the parameter table 6 to set parameter values of various tone factors, such as a tone pitch, volume and color, corresponding to the sensor outputs received via the interface 9, and transmits the thus-set parameter values to the tone generator 13. On the basis of the transmitted parameter values, the tone generator 13 generates a single tone signal corresponding to operating positions of the operator member 32 about or along the individual axes. Namely, in the control apparatus 30, generation is instructed of a single tone signal which corresponds to operating positions, about or along the X, Y and Z axes, of the operator member 32. The tone generator 13 may employ any of the conventionally-known tone generation methods, such as the waveform memory method. Further, the tone generator 13 may be implemented either by a hardware tone generator board or by a software tone generator program.

As necessary, a control switch 14 may be provided, for example, on the distal end portion 32a of the operator member 32, so that a necessary parameter value, such as that of a tone volume, can be set by rotation, depression or other form of operation, by the human operator, of the control switch 14. Although such a control switch 14 is not necessarily essential to the features of the present invention, the provision of the control switch 14 is preferable in that it allows a tone volume parameter to be set/controlled through human operator's operation with a fingertip or the like. As an example, the control switch 14 may be used to control an overall volume of a tone so that after-touch control can be performed on a tone to be generated in accordance with an operating velocity, about the Y axis, of the operator member 32 operated by the user for performance input.

On the display screen 15, there are displayed, for example, images of a musical staff, keyboard, etc. at the time of performance input operation by the human operator. Thus, a tone pitch corresponding to an operating position of the operator member 32 can be indicated by displaying a corresponding note on the musical staff, or by displaying a corresponding key of the keyboard in a given color different from the color of the other keys. In this way, the human operator can visually ascertain the pitch of a tone signal having been input via the operator member 32. By thus allowing the human operator to visually ascertain current operating states on the display screen 15, the control apparatus 30 can significantly simplify the special type of input operation, via the operator member 32, of performance information.

Figure 3:
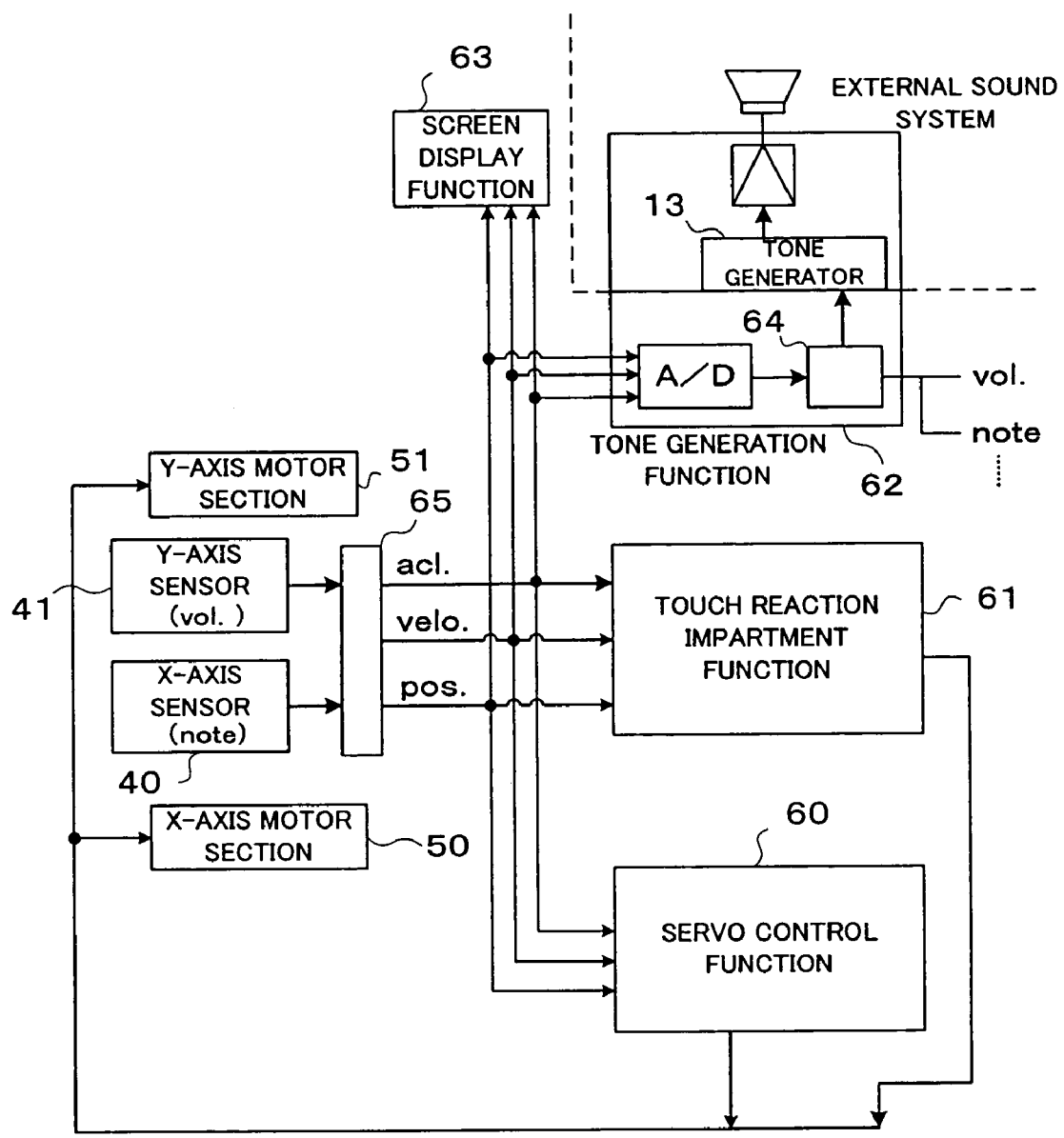
FIG. 3 is a functional block diagram illustrating various functions performed by the control apparatus.

FIG. 3 is a functional block diagram outlining various functions that can be performed by the control apparatus 30, where block sections 60–63 represent the functions of the control apparatus 30 itself. Broadly classified, the control apparatus 30 has a servo control function 60, touch reaction (i.e., reactive force) impartment function 61, tone generation function 62 and a screen display function 63. Let's assume that, in the illustrated example of FIG. 3, a tone pitch parameter value ("note") is set in response to an output from the X-axis sensor section 40 and a tone volume parameter value (vol.) is set in response to an output from the Y-axis sensor section 41. Although a tone color parameter value can also be set/controlled in response to an output from the Z-axis sensor section 42 as noted above, illustration of functions (processes) pertaining to the Z axis is omitted for convenience. Arithmetic calculation circuit 65 can generate velocity and acceleration data for each of the axes as noted above, by differentiating the detection data output from the axis-by-axis sensor sections (rotational position sensors). Position information ("pos."), velocity information ("vel.") and acceleration information (acl.) thus obtained for each of the axes is supplied to each of the above-mentioned functions 60–63.

The servo control function 60, which is mainly directed to realizing the above-mentioned first aspect of the present invention, is performed, for each of the axes, to generate reactive force information in accordance with a difference between a reference operating position based on the predetermined model operation information and an actual current operating position of the operator member 32 detected/calculated on the basis of the corresponding sensor output. The reactive force information, thus generated for each of the axes in accordance with the difference between the reference operating position and the actual current operating position, is supplied to the corresponding motor section (in the illustrated example, the X-axis motor section 50 or Y-axis motor section 51).

The touch reaction impartment function 61, which is mainly directed to realizing the above-mentioned second aspect of the present invention, is performed, for each of the axes, to impart the operator member 32 with a touch reaction corresponding to touch reaction information by referring to the touch reaction setting table (i.e., touch data table), included in the parameter table 6 (see FIG. 2), on the basis of the corresponding sensor output and thereby generating the touch reaction information for that axis. In this way, the touch reaction impartment function 61 can give the human operator a virtual operation feeling and virtual touch feeling. Namely, the actuator 21 (FIG. 2) is driven (turned on and off) by drive signals (e.g., pulse-width-modulated current signals), corresponding to the generated touch reaction information, so that the corresponding motor sections (in the illustrated example, the X-axis motor section 50 and Y-axis motor section 51) are rotated to impart touch reactions (virtual reactive forces) to the operator member 32. Further, tactile characteristics of the touch reactions to be imparted to the operator member 32 can be variably set as desired via the parameter controller 7 (FIG. 2), and thus the human operator can freely make touch reaction settings, for example in accordance with the tone generator used, to thereby obtain a desired touch feeling. Note that the touch reaction impartment function 61 may be used in conjunction with the servo control function 60 in order to generate more appropriate reactive forces.

Further, the tone generation function 62 is performed to set parameter values of various tone factors, such as a tone pitch, volume and color, on the basis of the axis-by-axis sensor outputs and cause tone generation based on the thus-set parameter values. As illustrated in FIG. 2, the tone generator 13 and a sound system, including an amplifier, speaker, etc., are external equipment connected wirelessly with the control apparatus 30. Further, the screen display function 63 is performed to indicate, on the display screen 15 (FIG. 2), a pitch of a tone, designated in accordance with an operating position of the operator member 32, by displaying a corresponding note on the musical staff, or by displaying a corresponding key of the keyboard in a given color different from the color of the other keys.

The following paragraph describes details of the servo control function (block 60 in FIG. 3) performed by the control apparatus arranged in the manner of FIG. 2.

As the operator member 32 is operated by the human operator and sensor outputs corresponding to operating positions, about or along the X, Y and Z axes, of the operator member 32 are supplied via the interface 9 to the CPU 1, the CPU 1 performs, every predetermined clock timing, a process for detecting current operating states, for the individual axes, of the operator member 32 on the basis of the axis-by-axis sensor outputs. Then, the CPU 1 calculates values of performance parameters, such as a tone pitch, volume and color, each corresponding to any one or any combination of the operating position, velocity and acceleration for each of the axes or combination of the outputs for two or more of the axes, so that the tone generator 13 generates a tone signal on the basis of the calculated performance parameter values (tone generation function). When the operator member 32 has been operated, the CPU 1 performs, in addition to the above-mentioned tone signal generation process, a process for using the servo control function to impart reactive forces to the operator member 32 by supplying the driver 20 with drive signals for driving the actuator 21 in a controlled manner. Details of the process for calculating the servo-control drive signals will be given below.

While detecting current operating positions of the operator member 32 on the axis-by-axis basis, the CPU 1 performs a process for calculating difference values between reference operating positions represented by model operation information supplied for the individual axes from the model operation information table in the data ROM 3 and actual current operating positions of the operator member 32 detected for the individual axes. The MIDI performance data, stored in the music piece data memory section of the data ROM 3, are read out into the RAM 5 in accordance with predetermined performance event timing, and current performance event data to be executed at given event timing, next performance event data to be executed at next event timing and data indicative of a time interval between relative times of the current and next performance event data are buffered in the RAM 5. The performance event data include performance parameter data indicative of parameter values of various tone factors of a tone to be generated.

Upon arrival at given performance event timing, the CPU 1 newly reads out, from the music piece memory section of the data ROM 3, next performance event data to be executed at next event timing, and accordingly it updates the current performance event data, next performance event data and data indicative of a time interval between the relative times of the current and next performance event data presently buffered in the RAM 5. Namely, the CPU 1 not only rewrites the previous next performance event data and time interval (i.e., data and time intervals stored in the RAM 5 as the next performance event data and time interval stored at the last timing) in accordance with the newly read-out next performance event data, but also re-buffers the previous next performance event in the RAM 5 as new current performance event data. Note that the previous current performance event data buffered at the last timing is retained as last performance event data.

Then, with reference to the model operation information table stored in the data ROM 3, model operation information to be read out at the given performance event timing is determined, in accordance with the current and next performance event data and time interval data presently buffered in the RAM 5 and last performance event data. Thus, at the current event timing, model operation information which is indicative of operating positions to be taken by the operator member 32 for the individual axes is generated on the basis of the MIDI performance data. With the thus-generated model operation information, it is possible to designate axis-by-axis operating positions of the operator member 32 for generating a tone at the current event timing in an accurate manner. Because such model operation information is generated every event timing, accurate operating positions of the operator member 32 to be taken for a performance of a given music piece can be designated sequentially in accordance with a progression of the performance.

After generation of the model operation information from the data ROM 3, calculation is made, for each of the axes, of a difference value between the reference operating position and the actual current operating position detected on the basis of the corresponding sensor output. The thus-calculated difference values each represent a difference between the reference operating position, relative to (about or along) the corresponding axis, indicated by the model operation information and the current operating state, for that axis, of the operator member 32 actually operated by the human operator. Reactive forces to be imparted to the operator member 32 are controlled in accordance with the difference values, so that reactive forces corresponding to the differences between the reference operating position and the actual current operating states can be imparted to the operator member 32. Therefore, the human operator can directly perceive, through the reactive forces imparted to the operator member 32, whether or not the current operating positions of the operator member 32 operated by him or her accurately match the reference operating positions, or how far the current operating positions are different or deviated from the reference operating positions.

Then, the CPU 1 generates drive signals (reactive force information) for driving the actuator 21, on the basis of the calculated axis-by-axis difference values. The thus-generated drive signals are supplied to the driver 20, after being converted into analog signals via the D/A converter 11, so that the driver 20 drives the actuator 21 on the basis of the supplied drive signals, as noted earlier. Specifically, the drive signals are supplied to the driver 20 time-divisionally among the X, Y and Z axes, in accordance with which the actuator 21 may drive the X-, Y- and Z-axis motor sections 50, 51 and 52 on a time-divisional basis. Namely, reactive forces are imparted to and act on the operator member 32 in accordance with the differences between the reference operating positions and the actual current operating states determined for the X, Y and Z axes.

Figure 4A:
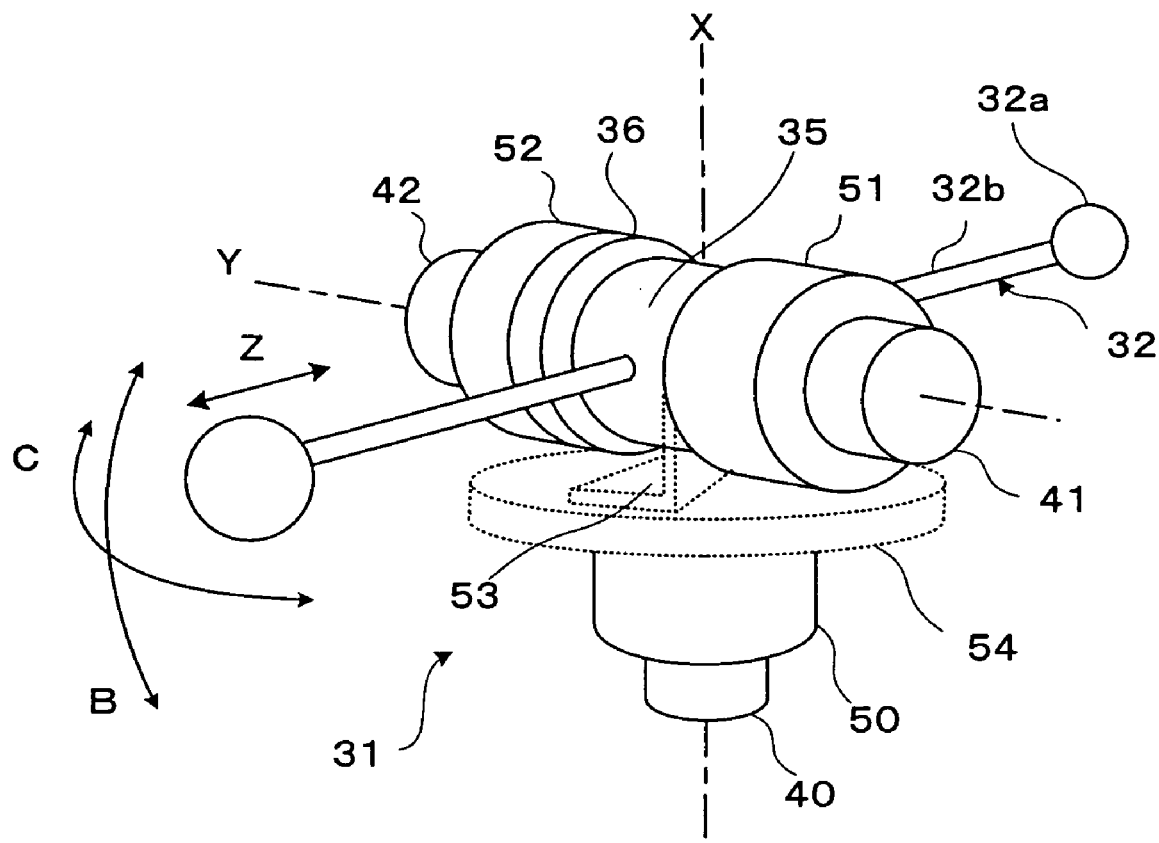
FIG. 4A is a schematic perspective view extractively showing a mechanism for driving an operator member shown in FIG. 1.
Figure 4B:
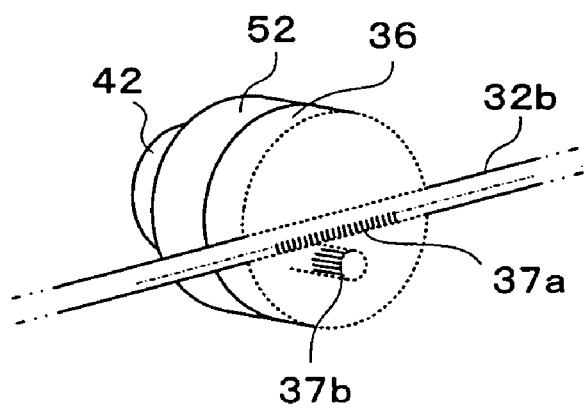
FIG. 4B is a schematic view showing an example structure of a gearbox of FIG. 4A.

Now, a mechanism for driving the operator member 32 will be described with reference to FIG. 4A that is a perspective view of the base section 31 and operator member 32. In the figure, the operator member 32 extends through a guide section 35, and the guide section 35 is mechanically coupled with the X-, Y- and Z-axis motor section 50–52. The Y-axis motor section 51 is supported on a Y-axis motor base 53, which is in turn supported at its lower end surface on an X- axis motor base 54. In the illustrated example, the X-axis motor section 50 is connected to the guide section 35 via the X-axis motor base 54 and Y-axis motor base 53. As the operator member 32 is operated in a direction of arrow C (i.e., about the X axis), all components provided on the X-axis motor base 54 together pivots about the X axis (in a leftward or rightward direction) with the X-axis motor base 54 functioning as a pivot support, and the X-axis sensor section 40 detects the pivotal movement. Then, as the X-axis motor section 50 is driven, a pivoting force about the X axis is applied to all the components provided on the X-axis motor base 54; in this way, an X-axis-related reactive force is imparted to the operator member 32 in the arrow C direction. Further, as the operator member 32 is operated in a direction of arrow B (i.e., about the Y axis), the guide section 35 pivots about the Y axis (in an upward or downward direction) with the Y-axis motor base 53 functioning as a pivot support, and the Y-axis sensor section 41 detects the pivotal movement. Then, as the Y-axis motor section 50 is driven, a vertical pivoting force about the Y axis is applied to the guide section 35; in this way, a Y-axis-related reactive force is imparted to the operator member 32 in the arrow B direction. The Z-axis motor section 52 is connected via a gearbox 36 to the guide section 35. The gearbox 36 is a movement transformation mechanism for transforming linear movement, along the Z axis, of the operator member 32 into appropriate rotary movement and transforming rotary movement of the Z-axis motor section 52 into linear movement, along the Z axis, of the operator member 32. As illustratively shown in FIG. 4B, a shaft portion 32b of the operator member 32 has an elongated gear tooth portion 37a provided in an axial direction thereof and having teeth at predetermined pitches. Further, within the gearbox 36, there is provided a slide gear 37b meshing with the gear tooth portion 37a and rotatable in operatively interlocked relation to a rotation shaft (not shown) of the Z-axis motor section 52. The Z-axis sensor section 52 detects the linear movement transformed via the gearbox 36. As the Z-axis motor section 52 is driven, its rotary movement is transformed via the gearbox 36 into linear movement along the Z axis, and the linear movement acts on the operator member 32 as a Z-axis-related reactive force.

In the illustrated example of FIG. 1B, when the operator member 32 is moved to a position L along the arrow C direction (i.e., about the X axis), without being moved in the arrow B and arrow A directions, at predetermined event timing, a reactive force acts on the operator member 32 in a direction of arrow F1 if a position M is an X-axis-related reference operating position. With such a reactive force F1, the human operator can perceive that the operator member 32 operated by the human operator has moved beyond the reference operating position in a direction of arrow LL. If the current operating position is a position LA closer to the reference operating position M than the position L, a reactive force F2 having a smaller intensity than the reactive force F1 may be imparted, in which case the human operator can perceive that the current operating position of the operator member 32 moved by his or her operation is closer to the reference operating position M although it does not exactly match the latter. If, on the other hand, the current operating position of the operator member 32 is a position R short of the reference operating position M, a reactive force acts on the operator member 32 in a direction of arrow F3, and the intensity of the reactive force is gradually varied in accordance with an offset from the reference operating position M. Needless to say, if no reactive force acts on the operator member 32, then the human operator can ascertain that his or her current operation of the operator member 32 is correct or matches the reference operating position. Therefore, with the control apparatus 30, the human operator can perceive, through the operator member 32, whether his or her current operation is correct or not, and how far the current operation is different from the correct operation. Further, if the human operator operates the operator member 32 in such a manner that the reactive force to the operator member 32 is eliminated to allow the operator member 32 to be manipulated by the human operator with a smaller force, the human operator can know the correct operating position. By controlling the impartment of such reactive forces on the basis of the model operation information based on automatic performance data of a music piece, the human operator or user can easily master or learn how to input performance information with the control apparatus 30.

Note that, in the present invention, the reactive force may be imparted in any other desired manner than the above-described, as long as the reactive force impartment can allow the human operator to feel a difference between a predetermined operating state based on the model operation information and an operating state actually taken through operation by the human operator. For example, the reactive force may be imparted in such a manner that its intensity becomes greatest (i.e., the operating feel of the operator member 32 becomes heaviest) at the correct operating position.

Next, details of the touch response impartment function 61 will be explained with reference to a block diagram of FIG. 5. In FIG. 5, reference numerals 70, 71, 72 and 73 represent multiplexers, and 74, 75, 76 and 77 represent A/D converters. 78 represents a hysteresis circuit, 79, 80 and 81 represent table groups corresponding to touch data table groups, and 82 a single table. Further, 83, 84 and 85 represent adders, and 86 a motor power adjustment table group comprising a plurality of motor power adjustment tables.

As an example, position information pos obtained from an output from the X-axis sensor section 40, velocity information vel and acceleration information acl obtained from an output from the Y-axis sensor section 41 is input via the corresponding multiplexers 70, 71 and 72 performing time-divisional multiplexing of the respective information and then converted via the corresponding A/D converters 74, 75 and 76. External input aux is used for other parameter setting via the control switch 14 (FIG. 2).

The position information pos input via the corresponding multiplexer 70 is supplied via the hysteresis circuit 78 to the table group 79. Once the position information pos is supplied to the hysteresis circuit 78, the circuit 78 determines an operating direction (positive or negative direction) of the operator member 32 on the basis of the velocity information vel and adds a hysteresis characteristic, corresponding to the determined operating direction of the operator member 32, to an output (position component of touch reaction information) provided from the table group 79 in accordance with the position information pos. More specifically, the table group 79 includes two table groups (i.e., "key-depression-related" table groups and "key-release-related" table groups) corresponding to the opposite (positive and negative) operating directions of the operator member 32. When the operator member 32 has been operated in the positive operating direction, the position information pos is supplied to the "key-depression-related" table groups, while, when the operator member 32 has been operated in the negative operating direction, the position information pos is supplied to the "key-release-related" table groups. Because the position component of the touch reaction information is provided using either one of the two table groups (i.e., "key-depression-related" table groups and "key-release-related" table groups) depending on the operating direction of the operator member 32, the position component output from the table group 79 in accordance with the position information pos takes a different value depending on whether the operator member 32 has been operated in the positive operating direction or in the negative operating direction. In this way, a touch reaction to be imparted to the operator member 32 can be made to assume a hysteresis characteristic corresponding to the operating direction of the operator member 32, which can achieve a natural touch feeling responsive to the operating direction. The table group 79 may comprise only one table group, instead of including two separate table groups corresponding to the positive and negative operating directions. In this case, a hysteresis characteristic corresponding to the operating direction of the operator member 32 may be added to the table output (position component of the touch reaction information) by performing an additive or subtractive arithmetic operation on the position information pos on the basis of the velocity information vel.

To the table group 79 is also supplied the velocity information vel, so that one table is selected from among a plurality of tables in the group 79 in accordance with the supplied velocity information vel. Then, a position component of the touch reaction information, corresponding to the position information pos, is read out from that table selected in accordance with the velocity information vel. Therefore, the position component output from the table group 79 is of a value reflecting both the position information pos and the velocity information vel. Interpolation section 87 performs linear interpolation on outputs from the table group 79, although exponential interpolation may be employed, instead of linear interpolation, to obtain finer interpolated values. The linear interpolation to be mentioned below may also be replaced with exponential interpolation.

The velocity information vel input via the corresponding multiplexer 71 is supplied to the table group 80 which has already been supplied with the position information pos. One table is selected from among a plurality of tables in the table group 80 in accordance with the supplied position information pos. Then, a velocity component of the touch reaction information, corresponding to the velocity information vel, is read out from that table selected in accordance with the position information pos. Interpolation section 88 performs linear interpolation on outputs from the table group 80.

The acceleration information acl input via the corresponding multiplexer 72 is supplied to the table group 81 which has already been supplied with the position information pos.

One table is selected from among a plurality of tables in the table group 81 in accordance with the position information pos. Then, an acceleration component of the touch reaction information, corresponding to the acceleration information ac, is read out from that table selected in accordance with the position information pos. Interpolation section 89 performs linear interpolation on outputs from the table group 81. The table group 81 may comprise data tables that are supplied with the velocity information vel, rather than the acceleration information ac, and output an acceleration component in response to the supplied velocity information vel.

Further, a parameter setting value given via the external input aux is supplied to the table 82, from which a table output, corresponding to the parameter setting value, is provided via an interpolation section 90. For example, the parameter given via the external input aux may be one for adjusting the degree of effectiveness of the touch reaction, or the like.

Then, data indicative of respective values of the thus-generated position, velocity and acceleration components are added via the adders 83 and 84 to thereby synthesize data indicative of touch reaction information. If, at that time, the other parameter, such as one for adjusting the degree of effectiveness of the touch reaction, is also added, the degree of effectiveness of the touch reaction can also be adjusted appropriately. In thus synthesizing touch reaction information, a different weight is applied to each of the position, velocity and acceleration components (and other parameter value). In this way, there can be generated touch reaction information based on the position information pos, velocity information vel and acceleration information ad based on the output from the X-axis sensor section 40, and the thus-generated touch reaction information is supplied to the motor power adjustment table group 86 that has already been supplied with the position information pos. One table is selected from among the plurality of the motor power adjustment tables in accordance with the position information pos. Then, a motor power adjustment value, corresponding to the data of the supplied touch reaction information is read out from that selected. Thus, the power of the motor can be adjusted in accordance with the motor power adjustment value. The output from the motor power adjustment table group 86 (i.e., touch-response imparting drive signal) is supplied via the driver 20 (FIG. 2), so that the X-axis motor section 50 is driven with the touch-response imparting drive signal so as to impart an X-axis-related touch response (virtual reactive force) to the operator member 32. Further, the data of the touch reaction information may be converted into analog signals for use as parameters to be displayed on the screen display by the screen display function.

Similarly, outputs from the Y-axis sensor section 41 and Z-axis sensor section 42 (position information pos, velocity information vel and acceleration information acl) are input via the corresponding multiplexers 70, 71 and 72 and subjected to the above-described processes on a time-divisional basis, so that touch response information is synthesized on the basis of the outputs from the Y-axis sensor section 41 and Z-axis sensor section 42 in the manner as described above. In the above-described manner, separate touch response information can be generated for the three axes on the basis of the three parameters, i.e. position, velocity and acceleration, so that reactions responsive to not only variation in the operating position of the operator member 32 but also variation over time (i.e., temporal variation) can be generated. Note that the user of the multiplexers 70–73 permits multiplexed processing of the X-, Y- and Z-axis sensor outputs, for example, in a plurality of the control apparatus 30.

Note that the parameters to be used for generation of the touch reaction information (i.e., parameters input to the touch data table) need not necessarily comprise all of the above-mentioned three parameters; any desired one or desired combination of the position, velocity and acceleration may be used as the parameters.

Whereas the preferred embodiments have been described above in relation to the case where the model operation information is determined using tone factors, such as tone pitch, color and volume, namely, in relation to reactive force control for musical instrument performance operation, the control apparatus of the present invention may also be arranged to provide the model operation information, on the basis of tempo information and/or velocity information of automatic performance data, to thereby allow the human operator to learn conducting for a music piece. The present invention may be applied input operation in various games, CAD designing, etc. in addition to various operation pertaining to musical performances, as long as it is arranged to allow the human operator or user to learn predetermined operation based on model operation data.

Further, the operating state to be compared on the basis of the model operation information may be other than an "operating position", such as an "operating velocity" or "operating acceleration".

In summary, the present invention is characterized by generating reaction information in accordance with a difference between a state of operation actually performed by the human operator and an operating state designated by model operating information and imparting a reactive force or reaction to the operator member in accordance with the generated reaction information. Such arrangements allow the human operator to perceive, on the basis of the imparted reactive force, the difference between the state of operation actually performed by the human operator and the operating state designated by model operating information, and thus the human operator can effectively master or learn how to properly operate the operator member. Further, as the human operator makes performance input (tone signal control), the present invention can impart an appropriate reactive force to the operator member in response to operation, by the human operator, of the operator member.

What is claimed is:

1. A control apparatus comprising:
   an operator member displaceable, in response to operation by a human operator, relative to at least one displacement axis;
   a detection section that detects an operating state of said operator member;
   a supply section that supplies model operation information indicative of an operating state to be taken by said operator member;
   a reactive force information generation section that generates reactive force information corresponding to a difference between the operating state detected by said detection section and the operating state indicated by the model operation information; and
   a reactive force impartment section that imparts said operator member with a reactive force corresponding to the reactive force information generated by said reactive force information generation section.

2. A control apparatus as claimed in claim 1 wherein said operator member is displaceable relative to a plurality of displacement axes,
- said detection section detects, separately for each of the displacement axes, displacement of said operator member responsive to the operation by the human operator,
- said supply section supplies, for each of the displacement axes, model operation information indicative of an operating state to be taken by said operator member for the displacement axis,
- said reactive force information generation section generates, for each of the displacement axes, reactive force information corresponding to a difference between the operating state detected for the displacement axis by said detection section and the operating state indicated by the model operation information supplied for the displacement axis, and
- said reactive force impartment section imparts, for each of the displacement axes, said operator member with a reactive force corresponding to the reactive force information generated for the displacement axis by said reactive force information generation section.

3. A control apparatus as claimed in claim 2 wherein each of the displacement axes is associated with any of a plurality of tone factors, and
- which further comprises a tone signal generation section that generates a tone signal by setting or controlling the plurality of tone factors in accordance with detection data indicative of the operating states detected by said detection section for individual ones of the displacement axes.

4. A control apparatus as claimed in claim 1 wherein said reactive force impartment section includes an electric motor that is driven so as to impart said operator member with a reactive force corresponding to the reactive force information generated by said reactive force information generation section.

5. A control apparatus as claimed in claim 2 wherein at least one of the displacement axes is a linear-displacement axis along which said operator member is displaceable linearly.

6. A control apparatus as claimed in claim 2 wherein at least one of the displacement axes is a pivotal-displacement axis about which said operator member is pivotally displaceable.

7. A control apparatus as claimed in claim 1 wherein said detection section detects, as the operating state of said operator member, at least any one of physical variables of an operating position, operating velocity and operating acceleration, and
- wherein said supply section supplies model operation information corresponding to the physical variable detected by said detection section.

8. A control apparatus comprising:
- an operator member pivotable, in response to operation by a human operator, about a plurality of axes;
- a plurality of detection sections provided in corresponding relation to the plurality of axes, each of said detection sections detecting an operating state, for the corresponding axis, of said operator member to thereby output a detection signal corresponding to the detected operating state;
- a supply section that supplies, for each of the axes, model operation information indicative of an operating state to be taken by said operator member;
- a reactive force information generation section that generates, for each of the axes, reactive force information corresponding to a difference between the operating state detected for the axis by one of said plurality of detection sections and the operating state indicated by the model operation information supplied for the axis; and
- a reactive force impartment section that imparts the individual axes with separate reactive forces on the basis of the reactive force information generated for the individual axes by said reactive force information generation section,
- wherein a plurality of control signals are provided on the basis of the detection signals outputted from individual ones of said detection sections.

9. A control apparatus as claimed in claim 8 which further comprises a tone control section that controls a tone on the basis of the plurality of control signals.

* * * * *